United States Patent [19]

Weishaar

[11] 4,303,051
[45] Dec. 1, 1981

[54] FUEL ECONOMIZER

[75] Inventor: Rainer E. Weishaar, Mt. Clemens, Mich.

[73] Assignee: Michigan Motor Corporation, Mt. Clemens, Mich.

[21] Appl. No.: 794,815

[22] Filed: May 9, 1977

[51] Int. Cl.³ .......................................... F02M 31/00
[52] U.S. Cl. ........................................ 123/557; 123/3
[58] Field of Search .............. 123/122 E, 3, 557, 558, 123/537, 538, 549; 219/206, 207, 306, 307; 261/142, 144, 145

[56] References Cited

U.S. PATENT DOCUMENTS

| | | | |
|---|---|---|---|
| 350,769 | 10/1886 | Ragot | 123/122 E |
| 745,199 | 4/1978 | Youngquist | 219/306 |
| 1,065,580 | 6/1913 | Beucus | 123/122 F |
| 1,532,189 | 4/1925 | Lamont | 219/306 |
| 2,247,181 | 6/1941 | Berhonda | 123/133 |
| 2,686,863 | 8/1954 | Chandler | 819/306 |
| 3,354,872 | 11/1967 | Gratzmuller | 123/122 E |
| 3,717,129 | 2/1973 | Fox | 123/3 |
| 3,828,736 | 8/1974 | Koch | 123/3 |
| 3,855,980 | 12/1974 | Weisz | 123/122 E |
| 4,003,356 | 1/1977 | Naylor | 123/122 E |
| 4,008,692 | 2/1977 | Shinohara | 123/3 |
| 4,044,742 | 8/1977 | Linder | 261/145 |
| 4,083,340 | 4/1978 | Furr | 123/122 E |

FOREIGN PATENT DOCUMENTS

579942 7/1959 Canada ............................... 219/306

Primary Examiner—Ronald H. Lazarus
Attorney, Agent, or Firm—Whittemore, Hulbert & Belknap

[57] ABSTRACT

An engine fuel economizer comprising an electric fuel heating device interposed between the fuel pump and carburetor of a gasoline engine in proximity to the carburetor, a catalytic vapor condenser and filter interposed between the heating device and carburetor, and a relief valve interposed between the heating device and vapor condenser and connected to the fuel line between the fuel tank and fuel pump.

19 Claims, 5 Drawing Figures

FUEL ECONOMIZER

SUMMARY OF THE INVENTION

The present invention was developed for incorporation into the fuel system of an automotive vehicle using a gasoline powered internal combustion engine. Its utility is not so limited, and it may be employed in the fuel supply system of any gasoline powered internal combustion engine.

The fuel economizer has been rigorously tested in automobiles, and fuel savings up to 30% have been obtained.

The usual automotive vehicle using a gasoline powered internal combustion engine comprises a fuel tank, a fuel pump, and a carburetor. The carburetor is provided with a well for receiving gasoline from the fuel pump, and a float controlled valve maintains the gasoline at a constant level in the well. The usual carburetor includes a venturi through which air for combustion is drawn at substantial velocity, thus producing in the venturi a pressure substantially less than atmospheric. This reduced pressure includes a flow of fuel from the well of the carburetor, and as the gasoline in liquid phase emerges from jets or nozzles within the venturi, it is atomized or vaporized, or both, and mixed with the combustion air flowing through the venturi.

This mixture of air and fuel is delivered to a manifold and from the manifold is drawn into the engine cylinders during the suction strokes of the pistons therein. The fuel-air mixture is compressed in each cylinder during the compression stroke of the piston, and is then ignited, either by a spark in the conventional engine, or by compression with or without supplementary heating means, in a diesel engine. Ideally, combustion of the fuel-air mixture, which is initiated at the spark plug gap, progresses rapidly and is fully complete at the end of the power stroke of the cylinder. Too rapid burning or detonation is wasteful and causes knocking. Too slow burning results in some fuel failing to burn and being discharged in the exhaust. It is recognized that in the usual 4-cycle gasoline engine a very substantial percentage of fuel is wasted, and a relatively small percentage of the total energy available in the fuel is converted into usable energy by the engine.

The usual fuel pump in automobile engines is a diaphragm pump, in which the force applied to the diaphragm during the pumping stroke, is determined by a spring so that in theory the fuel is delivered by the pump at a rate determined by consumption and at a pressure determined by the spring. Flow to the carburetor well is controlled by a float controlled needle valve, as previously described.

In accordance with the present invention, the fuel economizer comprises a heater having a small chamber connected into the fuel line between the fuel pump and carburetor, and an electric heater in the chamber. The capacity of the chamber is small so that the quantity of fuel in the chamber is quickly brought to the desired temperature. A vapor condenser and filter unit is connected between the heater and carburetor. The vapor condenser comprises a small condensing chamber packed with metal wool, or shavings, filaments or pellets, which functions to ensure that fuel is delivered therefrom in liquid phase. The vapor condenser includes an auxiliary chamber downstream from the condensing chamber which receives a filter whose function is to prevent passage of any metal particles from the condensing chamber to the carburetor.

To prevent development of a pressure of the fuel as supplied to the vapor condenser, a pressure relief valve is connected between the heater and condenser, which is set to maintain pressure below a predetermined value, as might occur from heating and/or partial vaporization of the fuel as a consequence of being heated because of a check valve between the fuel pump and heater. The relief valve is connected to the fuel line intermediate the fuel tank and fuel pump.

The very significant improvement in engine efficiency and fuel economy is evidently attributable to a more efficient burning and utilization of the fuel in the engine. No completely satisfactory theoretical explanations for the improved results have been found, but the improved results have been established by rigorous comparative tests before and after installation of the economizer in many different types of automobiles and under widely varying conditions.

DETAILED DESCRIPTION

Figure 1:
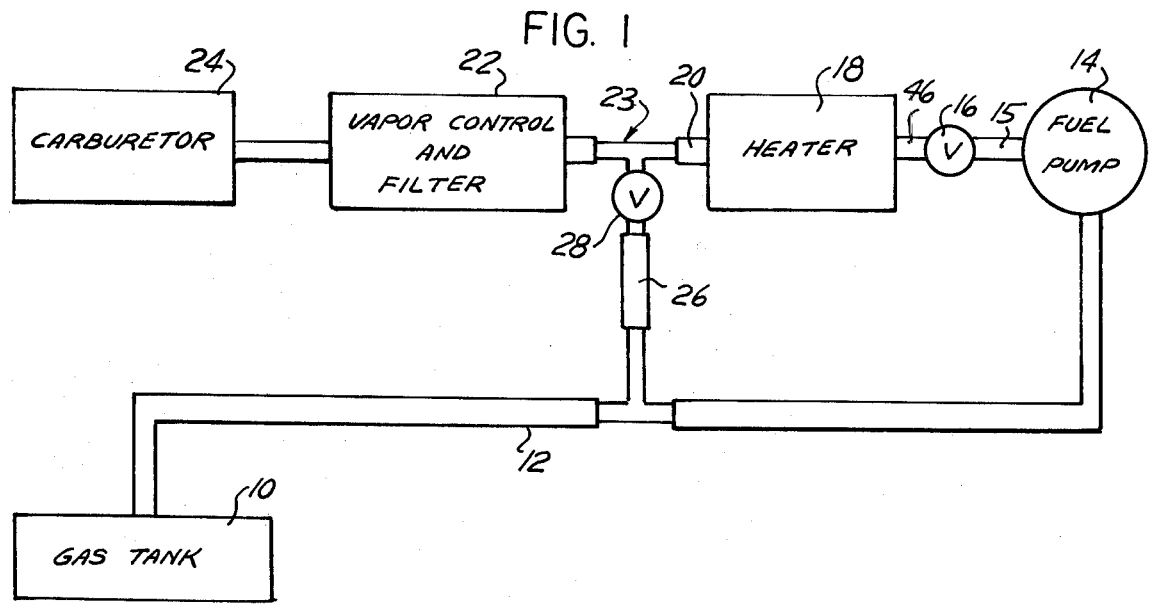
FIG. 1 is a diagrammatic view of the fuel supply system from the fuel tank to the carburetor of an internal combustion engine.

Referring now to the drawings, the complete system for supplying fuel from the fuel tank to the engine carburetor is shown diagrammatically. Fuel is pumped from the fuel tank 10 through fuel line 12 by a fuel pump 14. The fuel delivered by pump 14 flows through a fuel line 15 and check valve 16 to the heater 18 where it is heated as required to the desired temperature. The fuel then flows through fuel line 20 to the vapor condenser-filter unit 22, which, as will later appear, includes a built-in check valve. From the unit 22 the fuel, in entirely liquid phase, flows to the carburetor 24. The carburetor is entirely conventional, and includes a well for receiving liquid gasoline, and a float controlled needle valve for maintaining the fuel at a predetermined level in the well, none of these conventional elements being illustrated.

Intermediate the heater 18 and the vapor condenser-filter 22 is a fuel return device 23 including a pressure relief valve 28 connected to fuel line 12 through line 26 to prevent development of undesirably high pressure in the system from expansion and/or vaporization of fuel. Fuel passing relief valve 28 will return to fuel line 12 and will eventually be recirculated by fuel pump 14.

The fuel pump 14 and the carburetor 24 are conventional and are preferably the usual pump and carburetor provided in the vehicle. The fuel economizer of the present invention is installed by cutting fuel lines 12 and 15 and inserting the heater, vapor condenser-filter, and return device 23 with relief valve 26 therein. Fuel pumps as presently provided are variable delivery, constant pressure diaphragm pumps, as is well understood in the art.

Check valve 16 is provided to prevent back flow to the pump and without relief valve 28 and return passage 26, pressure in the system between the check valve 16 and carburetor 24 might exceed desirable values.

Figure 2:
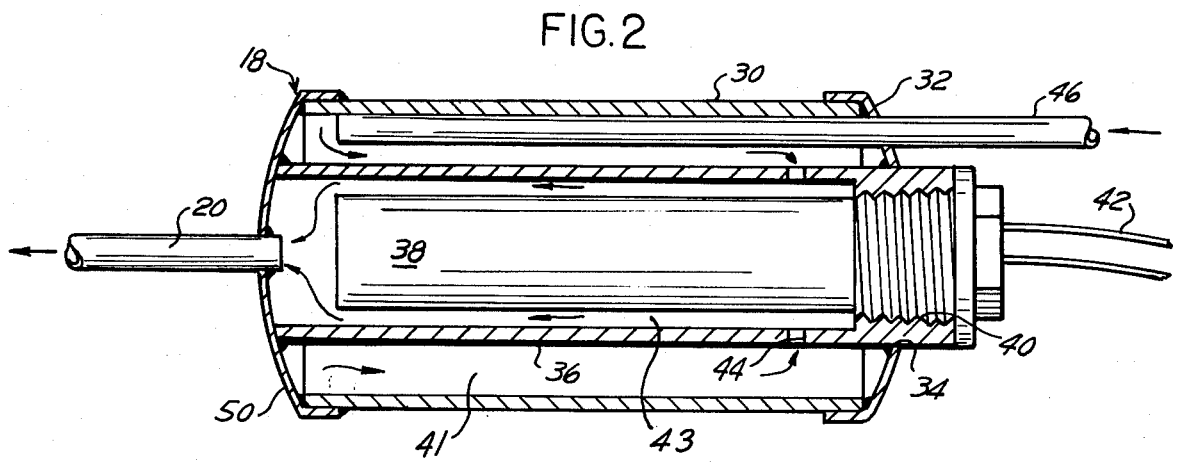
FIG. 2 is an enlarged sectional view of the heater seen in FIG. 1.

Referring now to FIG. 2, the details of the heater 5 comprises an outer cylindrical shell or casing 30 having a domed cap 32 welded or otherwise sealingly connected thereto. Cap 32 has an enlarged central opening 34 which receives tubular housing 36 for a heating rod 38, the housing and rod being threaded together as seen at 40. The casing 30 and housing 36 define between them an elongated annular preheating passage 41. The heating rod 38 is a commercially available self-contained heater which includes thermostatic controls adapted to control current supply through leads 42 to maintain liquid in contact with the rod at a preset temperature. The control is modulating, and cuts off current flow when the preset temperature is attained. Tubular housing 36 is provided with a plurality of ports 44 adjacent the upstream end thereof. It will be seen that an annular heating passage 43 is provided between the rod 38 and housing 36, and that the radial dimension or thickness of the passage is small, as for example, less than ⅛".

The domed cap 32 is provided with a laterally located opening which receives an end of fuel line 46 which is connected through check valve 16 to fuel pump 14. The outlet end of line 46 is located adjacent the downstream end of the heater, so that fuel flows reversely along the tubular member 36, through ports 44, and thence forwardly over the heat rod 38 and through the relatively narrow annular heating passage 43 between the heat rod and member 36.

The downstream end of shell 30 is closed with a second domed cap 50, which is welded or otherwise securely connected thereto and to the adjacent end of tubular housing member 36. Cap 50 has a central opening which receives the end of a short section of fuel line 20 for connection to the fuel return device 23.

In a practical embodiment of the invention, the tubular portions 30, 36 and caps 32, 50 of the heater were formed of stainless steel, and the welded connections were rated safe at 3000 psi. The outside diameter of the heater was about 2", and its length between the domed caps was about 4¼". The tubular housing 36 had an internal diameter of about 1". The outer diameter of the heater rod 38 was about ¾" and its length from its free inner end to the threads at the other end was about 3⅛". It was found that the internal capacity of the heater was about six fluid ounces.

The heat rod has a temperature setting range of about 115°–175° F. In designing a fuel economizer for a particular car, tests may be made to establish the precisely optimum setting, but apparently the temperature setting will normally be about 130° F. The heat rod will maintain the selected temperature with a variation of only two or three degrees.

Figure 4:
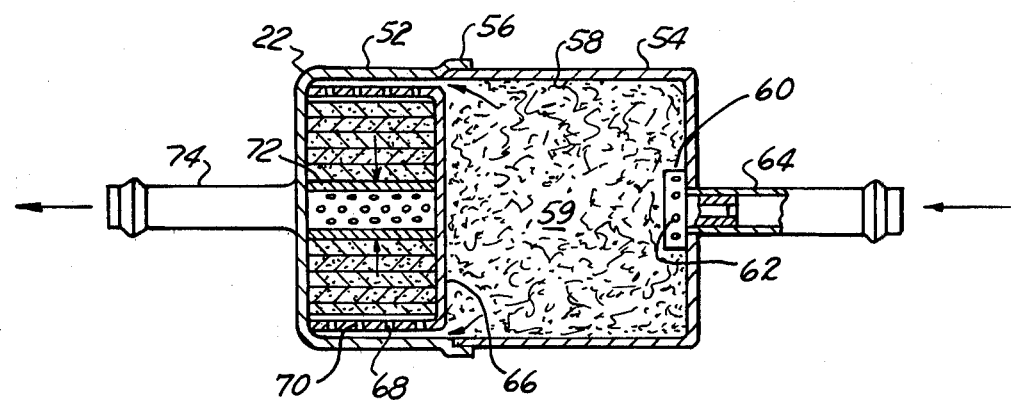
FIG. 4 is an enlarged sectional view of the vapor condenser-filter seen in FIG. 1.

Referring now to FIG. 4, details of the vapor condenser-filter unit are illustrated. The unit comprises two generally cylindrical cup-shaped portions 52 and 54 which are interconnected at 56 to provide a liquid-tight seal but which may be separated to replace the condenser and filter materials as required. The condenser chamber 58 formed by member 54 is filled with substantially uncompressed, tightly curled metal filaments seen at 59. Preferably, the metal is one which is not affected by gasoline or inclusions therein, and excellent results have been obtained where the filaments are of an alloy to be described later. The shavings as used in a particular embodiment of the invention had a width of somewhat less than 1/32", and a thickness of a few thousandths of an inch, curled into a tight coil of about ⅛" in diameter. The metal coils completely fill the chamber 54, but due to the coiled shape thereof, leave room for a small quantity of fuel.

At the inlet end of the chamber a check valve 60 is provided, including a housing having ports 62. The unit 22 has an inlet tube 64 which connects to the return device 23.

In the portion 52 of the unit 20 there is provided a cup 66 having openings 68 in the sides thereof, and containing conventional filter material 70, which may be an assembly of reversely folded sheet material. The purpose of the filter material is to prevent passage of metallic particles from the material 59. Within the cup 66 is a perforated tube 70 communicating with outlet tube 74 which connects to a tube leading to the carburetor.

In a practical embodiment of the fuel economizer, the casing made up of parts 52 and 54 had a length of about 2-5/16", a diameter of about 1⅞". The cup 66 has a depth of about ⅞", and its side wall is spaced from the interior surface of casing portion 52 by a small amount to provide for flow of fuel from chamber 58 to the ports or openings 68. In the embodiment of the invention just described, the fuel condenser-filter unit 22, with the coiled metal material 59 and the filter material 70 in place, had a capacity of 2½ fluid ounces in chamber 58 and one fluid ounce in the filter section.

Figure 3:
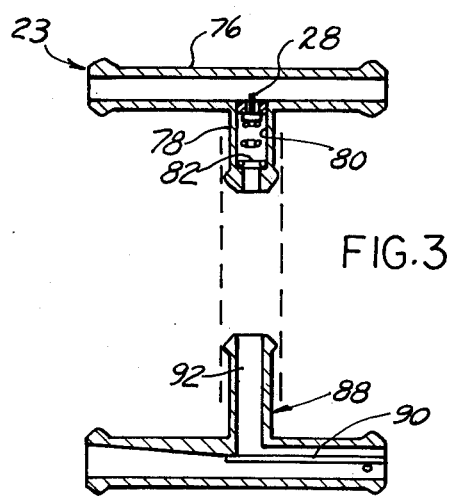
FIG. 3 is an elevational view, partly in section, of the pressure relief connection seen in FIG. 1.

Referring now to FIG. 3, the return flow device 23 is in the form of a T-fitting 76, one leg 78 of which provides a chamber 80 containing a compression spring 82 biasing the relief valve 28 toward closed position. Spring 82 is calibrated to maintain valve 28 closed at a pressure very slighly in excess of that normally provided by fuel pump 14, so that normally valve 28 remains closed. However, if pressure downstream from check valve 16 exceeds the preset pressure, valve 28 opens and fuel flows through line 26 to a second T-fitting 88, which is connected into the fuel line 12 as shown. Fitting 88 is provided with an interior baffle 90 which initially directs fuel flowing downward through leg 92 toward the fuel pump.

Figure 5:
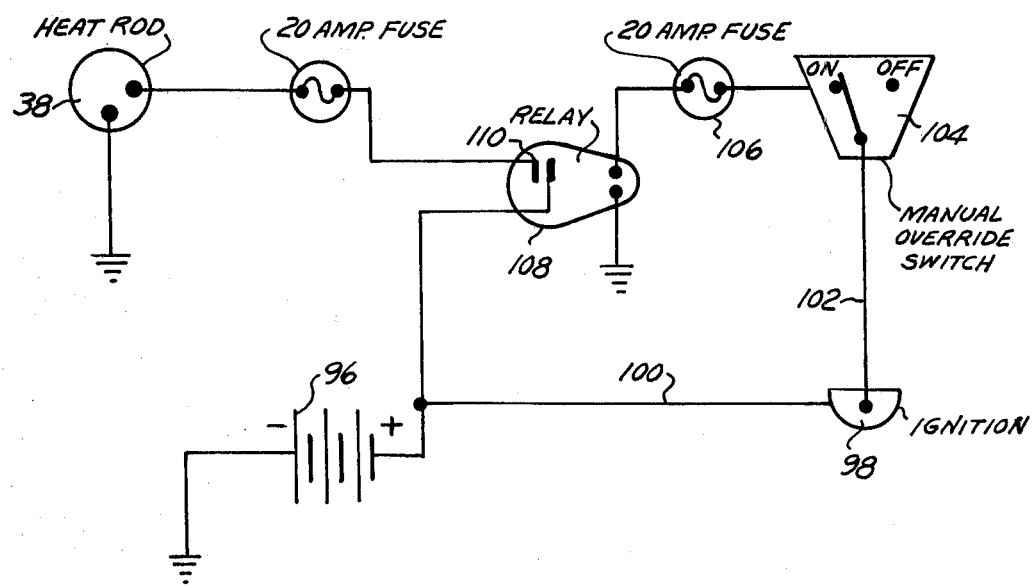
FIG. 5 is a simplified wiring diagram of the electrical system.

Referring finally to FIG. 5, there is shown diagrammatically the electrical connections in the system. Battery 96 is connected to ignition switch 98 through line 100, switch 98 including contacts (not shown) which connect line 102 to the battery, when the ignition switch is closed. Line 102 connects to a manual override switch 104, by means of which the electric heater rod may be disconnected. When override switch 104 is closed, the battery is connected through fuse 106 to a relay shown diagrammatically at 108. The relay when energized closes contacts 110, which connects battery 96 to the heating rod 38. As previously described, the heat rod as furnished by the supplier, regulates current flow to maintain a preset temperature in fuel as it exits housing 36.

In use, fuel within the chamber 36 containing the heat rod 38 is very quickly heated to the required temperature, which may be considered as about 130° F. for most automobiles. As heated fuel is drawn from housing or chamber 36, fuel flows reversely over the outer surface of chamber 36, where it is preheated.

The fuel condenser-filter unit 22 is connected as close as possible to the heater 18 to avoid heat loss, preferably within 2" thereof. It is preferably installed at least 8"

from the carburetor. Any gasoline which is vaporized as a consequence of being heated is condensed to a liquid state and passes to the carburetor as a liquid maintained at the temperature (about 130° F.) which produces maximum efficiency of the carburetor in forming the optimum fuel-air mixture and which accordingly produces maximum efficiency of combustion within the engine cylinders. This in turn prevents wasteful discharge of unburned fuel in the exhaust, and as a further important consequence reduces the pollutant effect of the exhaust gases.

The metal filaments seen at 59 may be further described as thin, narrow metal ribbons coiled into elongated coils, as for example, having a length of one or more inches and a coil diameter of about ⅛", or between 1/16" and 3/16". Ribbons of this conformation are readily produced as long, continuous, tightly curled or coiled chips in a turning operation.

A series of tests have been conducted, in which the catalyst was in the form of helices of tightly coiled metal filaments of an alloy which is primarily copper but includes substantial percentages of zinc and nickel. In general, the alloy contains 50–75% copper, 20–30% zinc, and 5–15% nickel, all by weight. A specific alloy which gave excellent results was:

| Metal | Part by Weight |
| --- | --- |
| Copper | 65% |
| Zinc | 25% |
| Nickel | 10% |

Tests conducted with the catalyst indicated that good results are also obtained when the material is in the form of small spherical pellets, about 1/64 to 1/16 inches in diameter, preferably about 1/32 inches. Described generally, this catalytic material may be defined as a grossly porous or discontinuous body.

From the foregoing it will be observed that the present invention is characterized in that it comprises a subassembly adapted to be connected as a unit into the otherwise entirely conventional fuel supply system for supplying fuel to the internal combustion engine of a motor vehicle. The conventional fuel supply system includes a fuel tank, a carburetor designed to receive liquid fuel from the fuel tank and to discharge a fuel-air mixture into the manifold of the internal combustion engine, and a fuel pump connected between the fuel tank and the carburetor. The subassembly comprises a heater designed to contain a very small amount of fuel and to heat it during its passage through the heater to a temperature of approximately 130° F. Connected between the heater and the conventional carburetor of the internal combustion engine is preferably provided a condenser-filter which is adapted primarily to ensure condensation of any fuel vapors which may have been emitted from the heater. The condenser includes filamentary or particulate filter material, of particular metallic composition as described and includes a filter to prevent passage of any particles from the condenser to the carburetor.

Finally the economizer includes a pressure relief bypass including a check valve, the upstream end of said bypass being connected intermediate the heater and the condenser-filter, and the downstream end of said bypass being connected between the gas tank and the fuel pump.

The foregoing structure also forms with the usual elements of the fuel supply system, a new combination.

What I claim is:

1. A fuel economizer for insertion into the fuel supply system of a conventional automotive vehicle engine having a fuel mixture intake manifold, such system consisting of a fuel tank, a fuel pump, and a carburetor connected to supply the fuel mixture directly into the engine intake manifold, the economizer comprising a heater having a heating chamber connected between the vehicle fuel pump and carburetor, heating means in said chamber, said chamber with said heating means therein having a liquid capacity of only a few fluid ounces to provide rapid heating of fuel as it passes through said chamber, and a catalytic vapor condenser operable to pass only gasoline in liquid phase to the carburetor connected between said heater and the vehicle carburetor, said vapor condenser comprising a second chamber filled with substantially uncompressed metal coils of thin, narrow, ribbon-like metal filaments, said second chamber with said coils therein having a liquid capacity of only a few fluid ounces.

2. A fuel economizer as defined in claim 1, in which said heating chamber is elongated, said heating means is in the form of an elongated electrical resistance rod providing an elongated annular fuel flow passage longitudinally of said rod.

3. A fuel economizer as defined in claim 2, in which said heater comprises an outer cylindrical casing, a radially spaced inner cylindrical housing in which said rod is located to provide an annular passage between said rod and housing, said heater having fuel flow openings between said casing and housing at the upstream end thereof, and fuel inlet means having an inlet port adjacent the downstream end of said casing, whereby fuel flows reversely over said housing and then forwardly through said annular passage.

4. A fuel economizer as defined in claim 2, comprising a filter connected between said condenser and the carburetor to prevent passage of metal particles from said coils to the carburetor.

5. A fuel economizer for insertion into the fuel supply system of a conventional automotive vehicle engine having a fuel mixture intake manifold, such system consisting of a fuel tank, a fuel pump, and a carburetor connected to supply the fuel mixture directly into the engine intake manifold, the economizer comprising a heater having an elongated heating chamber connected between the vehicle fuel pump and carburetor, an elongated electrical resistance heating rod in said chamber, said chamber with said heating means therein having a liquid capacity of only a few fluid ounces to provide rapid heating of fuel as it passes through said chamber, a catalytic vapor condenser connected between said heater and the vehicle carburetor, said vapor condenser comprising a second chamber filled with substantially uncompressed metal coils of thin, narrow, ribbon-like metal filaments, said second chamber with said coils therein having a liquid capacity of only a few fluid ounces, and a filter connected between said condenser and carburetor to prevent passage of metal particles from said coils to the carburetor, said vapor condenser and said filter being provided in communicating chambers in a single housing structure comprising a cannister, a cup at one end of said cannister having an open end against the downstream end of cannister and having a perforated side wall spaced from the side wall of the cannister, the metal coils being separated from the interior of the cup by its end wall, said filter material being in said cup.

6. A fuel economizer as defined in claim 1, comprising a check valve between the vehicle fuel pump and said heater, and a pressure relief valve connected between said heater and condenser, and a fuel passage connecting said valve to the inlet side of the vehicle fuel pump.

7. A fuel economizer as defined in claim 1, in which filaments are formed of an alloy which is mainly copper, with the balance essentially made up of substantial percentages of zinc and nickel.

8. A fuel economizer as defined in claim 7, in which the alloy contains 50–75% copper, 20–30% zinc and 5–15% nickel, by weight.

9. A fuel economizer as defined in claim 8, in which the alloy is approximately, by weight:

| | | |
|---|---|---|
| Copper | 65% | |
| Zinc | 25% | |
| Nickel | 10% | |

10. A fuel economizer for insertion into the fuel supply system of an automotive vehicle engine having a fuel mixture intake manifold, such system consisting of a fuel tank, a fuel pump and a carburetor connected to supply the fuel mixture directly into the engine intake manifold, fuel lines connecting the pump to the tank and to the carburetor, a fuel heater connected between the vehicle fuel pump and carburetor, said heater comprising an elongated outer casing, an elongated inner housing in said casing spaced radially inward from the walls of said casing to provide an annular flow passage therebetween, the ends of said housing and casing being sealed, ports at the upstream end of said inner housing communicating with said annular flow passage, a fuel supply port at the upstream end of said casing exterior of said housing, a conduit within said casing exterior of said housing in communication with said supply port and extending to adjacent the downstream end of said casing, a heat rod within said housing dimensioned to define therewith an elongated annular fuel flow passage for liquid fuel, said housing having an outlet port at its downstream end within said housing, and means for delivering heated and only liquid fuel to the engine carburetor.

11. A fuel economizer as defined in claim 10, in which said heat rod is an electrical resistance device adapted to be connected to the battery of the vehicle.

12. A fuel economizer as defined in claim 11, which comprises in addition a vapor condenser comprising a container having a compact but substantially uncompressed mass of flat, thin, tightly coiled metal filaments therein, said condenser being connected downstream and closely adjacent said heater.

13. A fuel economizer as defined in claim 10, in which the heat rod includes a thermostatic control effective to maintain the temperature of fuel discharged from said heater at approximately 130° F.

14. A fuel economizer as defined in claim 13, in which the internal capacity of the heater is only a few fluid ounces.

15. The method of improving fuel consumption characteristics of the internal combustion engine of an automotive vehicle having a carburetor designed to receive liquid fuel and to provide a mixture of such fuel in atomized state with air which comprises heating the fuel transit in just prior to admission to a carburetor to a temperature of approximately 130° while maintaining the fuel in substantially complete liquid phase, passing a heated fuel in liquid phase through a condenser formed of filamentary or pelletized metallic material to condense any vapors which may have been formed by heating the liquid fuel, and delivering such liquid heating fuel to the standard carburetor supplied on the internal combustion engine.

16. The method as defined in claim 15 in which the metallic material is an alloy which is mainly copper with the balance essentially made up of substantial percentages of zinc and nickel.

17. The method defined in claim 16 which comprises filtering the heated liquid fuel after passing it through the condenser to remove any metallic particles therefrom prior to delivering the liquid fuel to the conventional engine carburetor.

18. A fuel economizer comprising an elongated cylindrical heater comprising an outer casing and an inner cylindrical housing defining therebetween a fuel pre-heating chamber, an elongated cylindrical electrical heating rod in said housing defining therewith an annular final heating chamber effective to heat fuel to a temperature of about 130° F. as it makes a single traverse therethrough, said final heating chamber having its inner and outer surfaces spaced radially by about ⅛", a fuel pump for supplying liquid fuel to one end of said pre-heating chamber, ports in the opposite end of said final heating chamber to admit pre-heated fuel thereto in accordance with engine demand, a cylindrical combined condenser-filter unit connected directly to said final heating chamber, said unit having an inlet connection to said heater at its upstream end, and an outlet connection at its downstream end for direct connection to an engine carburetor, a cylindrical filter container having its outer wall spaced from the inner surface of said unit and having a multiplicity of ports to admit heated liquid fuel, a perforated tube centrally of said filter container, filter material between said tube and the outer wall of said container, said unit having its upstream end filled with filamentary or pelletized metallic condenser material.

19. An economizer as defined in claim 18, comprising a pressure relief valve connected between said heater and condenser-filter unit, and a return line connecting said valve to the fuel pump of the engine.

* * * * *